US007643715B2

(12) United States Patent
Taru et al.

(10) Patent No.: US 7,643,715 B2
(45) Date of Patent: Jan. 5, 2010

(54) OPTICAL POWER DELIVERY SYSTEM

(75) Inventors: Toshiki Taru, Yokohama (JP); Jonathan Cave Knight, Bath (GB)

(73) Assignee: Sumitomo Electric Industries, Ltd., Osaka (JP)

( * ) Notice: Subject to any disclaimer, the term of this patent is extended or adjusted under 35 U.S.C. 154(b) by 103 days.

(21) Appl. No.: 12/081,229

(22) Filed: Apr. 11, 2008

(65) Prior Publication Data
US 2009/0252452 A1   Oct. 8, 2009

(51) Int. Cl.
*G02B 6/02* (2006.01)
(52) U.S. Cl. ..................... 385/123; 385/28; 385/122; 385/141; 385/126; 385/127
(58) Field of Classification Search .................. 385/27, 385/28, 122, 123, 125, 141, 38, 31, 126, 385/127
See application file for complete search history.

(56) References Cited

U.S. PATENT DOCUMENTS

| 6,728,439 | B2 * | 4/2004 | Weisberg et al. | 385/28 |
| 7,072,553 | B2 * | 7/2006 | Johnson et al. | 385/127 |
| 2002/0164137 | A1 * | 11/2002 | Johnson et al. | 385/125 |
| 2003/0031407 | A1 * | 2/2003 | Weisberg et al. | 385/28 |

OTHER PUBLICATIONS

Shepard, J.D., et al., "High energy nanosecond laser pulses delivered single-mode through hollow-core PBG fibers", Optics Express, Feb. 23, 2004, pp. 717-723, vol. 12 No. 4, OSA.
Zenteno, L.A., et al., "Suppression of Raman gain in single-transverse-mode dual-hole-assisted fiber", Optics Express, Oct. 31, 2005, pp. 8921-8926, vol. 13 No. 22, OSA.
Fini, J.M., et al., "Distributed suppression of stimulated Raman scattering in an Yb-doped filter-fiber amplifier", Optics Letters, Sep. 1, 2006, pp. 2550-2552, vol. 31 No. 17, Optical Society of America.
Kim, J., et al., "Suppression of stimulated Raman scattering in high power Yb-doped fiber amplifier using a W-type core with fundamental mode cut-off", Optics Express, Jun. 12, 2006, pp. 5103-5113, vol. 14 No. 12, OSA.
British Search Report issued in British Patent Application No. GB 0806438.8, dated Jun. 30, 2008.
Taru, Toshiki et al., "Raman Gain Suppression in All-solid Photonic Bandgap Fiber," IEICE Tech Rep, vol. 107, No. 271, OFT2007-37, pp. 29-32, Oct. 2007.
Ren, Guobin et al., "Silica-based Low Loss All-solid Bandgap Fiber," Proc. Of COIN-ACOFT 2007, pp. 1-3, Jun. 2007.
Ren, Guobin et al., "Low-loss all-solid photonic bandgap fiber," Optics Letters, vol. 32, pp. 1023-1025, Apr. 2007.

* cited by examiner

*Primary Examiner*—Brian M Healy
(74) *Attorney, Agent, or Firm*—McDermott Will & Emery LLP

(57) ABSTRACT

An optical transmission system comprising a laser light source arranged to emit light having a frequency $\omega$; and an optical transmission line adapted to guide the light, wherein said optical transmission line includes a photonic bandgap optical fibre having a core guided mode at frequency $\omega$ and an attenuation band at a frequency of $\omega$-13 THz. The optical transmission system suppresses Raman scattered light thereby allowing high optical powers to be transmitted through optical fibre.

14 Claims, 3 Drawing Sheets

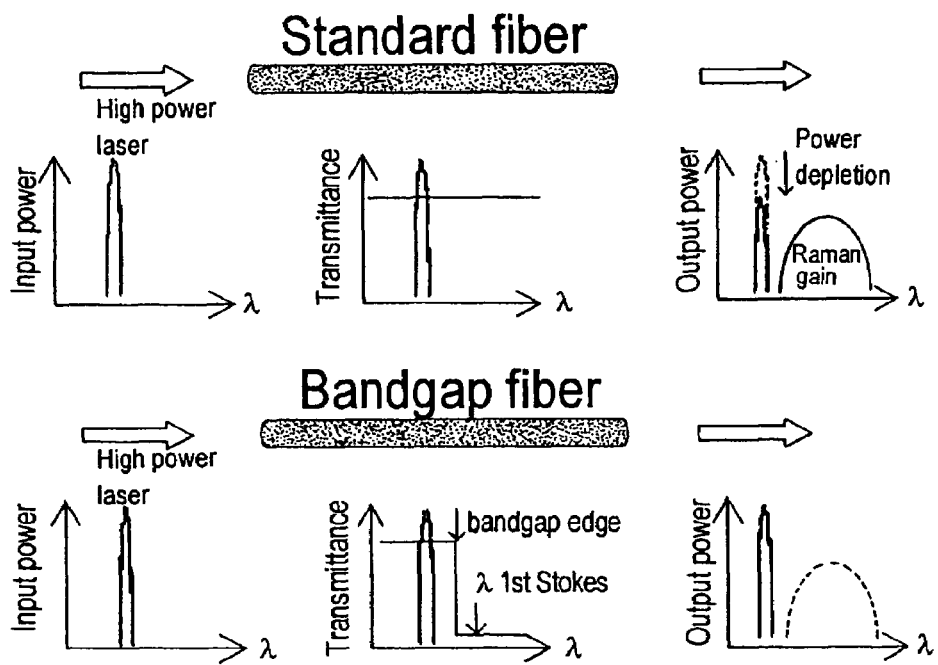
Figure 1
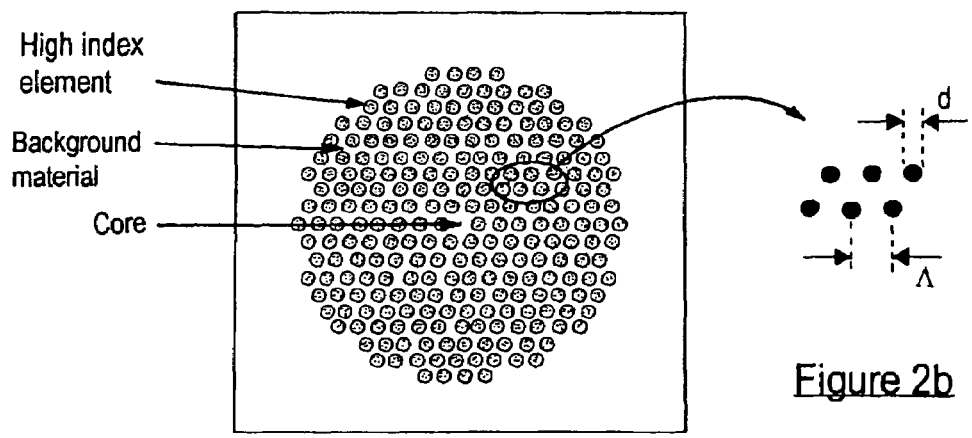
Figure 2a
Figure 2b

OPTICAL POWER DELIVERY SYSTEM

INTRODUCTION

The present invention relates to an optical transmission system, and more particularly to an optical transmission system arranged to transmit high optical powers.

DISCUSSION OF THE PRIOR ART

When high optical powers are transmitted in an optical fibre, the peak optical power within the fibre is reduced by non-linear processes. One such non-linear process is stimulated Raman scattering (SRS). In SRS, part of the energy of the incident light is transferred to a different frequency to that of the incident light. The energy transferred is mainly to the Stokes light having a lower frequency than the incident light. If the Stokes light is of high enough power, second or higher order Stokes light is produced.

In silica based optical fibre the frequency difference between incident and the first Stokes light is generally about 13 THz. For example, when light at a wavelength of 1064 nm is propagated through conventional optical fibre, the first Stokes light occurs at around 1120 nm.

The suppression or removal of Stokes light is important in the laser processing industry where high optical powers are sometimes used. The energy transfer caused by SRS may result in peak power depletion of incident light and deterioration of the capacity of laser processing.

Hollow-core photonic bandgap fibres (PBGFs) which can guide the light in an air core have been proposed for suppression of non-linear processes including SRS (J. D. Shephard et al., Opt. Express, 12 (2004), 717). However, their complex structure is an obstacle to realize commercial fabrication at present. As alternative methods, dual-hole assisted fibre (L. A. Zenteno et al., Opt. Express, 13 (2005), 8921), filter fibre (J. M. Fini et al., Optics Letters, 31 (2006), 2550), and W-type fibre (J. Kim et al., Opt. Express, 14 (2006), 5103) have been demonstrated. These fibres use mode coupling between the core guided mode and lossy cladding mode to eliminate the unwanted Stokes light. The intensity of light in the cladding mode decays due to the lossy nature of the cladding mode. Generally, the intensity of coupling from the core mode to cladding mode is affected by bending in these fibres. Moreover, the bandwidth over which light is coupled from core to cladding will change if the fibre is bent randomly. Therefore, the application of these SRS suppression schemes to delivery fibre is not practical. Hence, it is desirable to provide fibres which can suppress SRS and whose properties are stable against random bending in practical use.

SUMMARY OF THE INVENTION

The present invention provides an optical transmission system comprising: a laser light source arranged to emit light having a frequency $\omega$; and an optical transmission line adapted to guide the light, wherein said optical transmission line includes a photonic bandgap optical fibre which guides light at a frequency $\omega$ and attenuates light at a frequency of $\omega$-13 THz. The attenuation band or high loss band at a 13 THz offset from the transmission frequency is used to suppress Raman gain or light resulting from SRS.

The high loss band may be provided by the photonic bandgap fibre having a band edge between the frequency $\omega$ and the frequency $\omega$-13 THz. The band edge may be provided by the edge of the third order transmission band of the photonic bandgap fibre.

The photonic band gap fibre may have a transmission loss at a frequency $\omega$-13 THz that is 10 dB greater than the transmission loss at a frequency $\omega$.

The photonic bandgap fibre may be an all-solid photonic bandgap fibre including a cladding having a periodic array of elements, each element having higher refractive index than the surrounding background material. The elements may have a peak refractive index difference of 3% to the background material. The elements may be formed from high index rods of diameter d and spaced apart in the background material on a pitch $\Lambda$, wherein d/$\Lambda$ is 0.6. Optionally, the frequency $\omega$ may be the frequency of light at the wavelength of 1064 nm.

The present invention also provides a photonic bandgap optical fibre for use in suppressing stimulated Raman scattering, the fibre comprising: a core adapted to guide light at frequency $\omega$, and to attenuate light at a frequency of $\omega$-13 THz. The photonic bandgap optical fibre may have a transmission loss at a frequency $\omega$-13 THz that is 10 dB greater than the transmission loss at a frequency $\omega$.

The present invention also provides a method of suppressing stimulated Raman scattering in an optical transmission system, comprising: providing a laser light source emitting light having a frequency $\omega$; and coupling the emitted light into an optical transmission line, wherein said optical transmission line includes a photonic bandgap fibre having a core guided mode at frequency $\omega$ and a high loss band at a frequency of $\omega$-13 THz.

BRIEF DESCRIPTION OF THE DRAWINGS

FIG. 1 shows schematically the suppression of SRS in a photonic bandgap optical fibre compared to the SRS transmitted by a conventional optical fibre.

FIG. 2a shows a cross-section of the all-solid photonic bandgap fibre used in the present invention.

FIG. 2b is a schematic illustration showing the diameters and pitch of the high index elements in the cladding of the fibre.

DETAILED DESCRIPTION OF THE PREFERRED EMBODIMENTS

Figure 3:
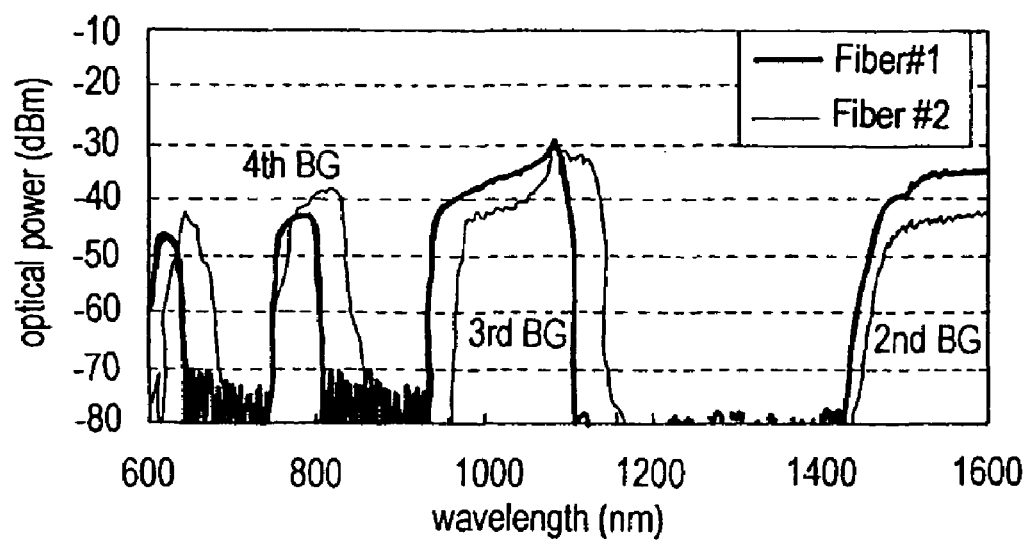
FIG. 3 is a graph showing transmission spectra for two all-solid PBGF fibres used in the present invention.

In contrast to hollow-core photonic bandgap fibres, silica based all-solid photonic bandgap optical fibres (PBGFs) provide the possibility of economical commercial manufacture. This is because they have a structure which can be accurately controlled to achieve a fibre with the desired properties in good agreement between design and experiment. These fibres also offer design flexibility and can achieve low loss.

In addition, all-solid PBGFs have strong attenuation bands which are an intrinsic property of the bandgap fibre. The attenuation band can be used to suppress stimulated Raman scattering (SRS).

FIG. 1 shows schematically how an all-solid PBGF suppresses SRS, compared to a standard fibre in which SRS is present. In both cases, high power laser light is coupled into the fibre. In the standard fibre, multiple-order SRS is observed based on the Raman shift of the fibre material. The all-solid PBGF provides high attenuation at the Stokes wavelength but does not attenuate at the laser frequency.

An all-solid photonic bandgap fibre was prepared as shown in FIG. 2a. The fibre consists of a cladding comprising a background material having high index elements included therein. The background material consists of silica glass without dopants. The high index elements consist of silica glass containing $GeO_2$ as a dopant. The fibre is formed by stacking rods in a periodic arrangement. The high index elements are formed from rods having a high index core. The outer region of the rods consist of the background material. The core of the fibre is formed by removing a high index rod and replacing it with a rod made of the same material as the background material of the cladding, namely silica glass without dopants. Once the rods have been stacked, normal fibre preparation methods are used to complete the manufacture of a preform and to subsequently draw it into fibre. For example, the stack and draw method can be used. The refractive index difference between the peak of the high refractive index elements and the silica glass background material is approximately 3% in the presently described embodiment.

As shown in FIG. 2b, the diameter of the high index elements is d, and the pitch between elements is Λ. The PBGF was designed such that the ratio d/Λ is approximately 0.6. This value of the ratio makes the photonic bandgaps deeper providing attenuation bands with less sensitivity to bending of the fibre. This is because the deeper photonic bandgap means a very large distortion of the fibre would be required to excite the nearest other modes.

From the preform, two fibres were drawn representing different embodiments. The parameters of each fibre are listed in table 1.

TABLE 1

|  | d/Λ | Fibre OD (μm) | core diam. (μm) | 3rd bandgap red edge (nm) |
|---|---|---|---|---|
| Fibre #1 | 0.6 | 165 | 9.7 | 1100 |
| Fibre #2 (reference) | 0.6 | 172 | 10.1 | 1140 |

The fibres were designed for use with a laser source operating at 1064 nm. In silica fibre, the Raman shift is around 13 THz, resulting in the first Stokes light occurring at around 1120 nm. The diameters of the two fibre were adjusted during manufacture to provide bandgap edges close to the wavelength of the Stokes light. Fibre #1 was adjusted to have an outer diameter of 165 μm and a core diameter of 9.7 μm, which provides a red bandgap edge located at 1100 nm. For Fibre #2, the outer diameter of the fibre was 172 μm and the core diameter was 10.1 μm, which provides a red bandgap edge located at 1140 nm. The calculated effective area of the design is around 50 m².

The position of the bandgap edges of the two fibres is shown in more detail in FIG. 3 where the transmission spectra of the fibres is shown from 600 nm to 1600 nm. The transmission spectra was measured through 50 m of the fibre wound on spools having a diameter of 160 mm. A fibre based supercontinuum source was used as a broadband light source for the transmission spectra measurement. The edges of the 3rd bandgap for both Fibre #1 and Fibre #2 are clearly shown. The red edge of the 3rd bandgap is at 1100 nm for fibre #1 and at 1140 nm for fibre #2. Fibre #1 shows over 40 dB isolation between transmission band and high loss band at wavelengths in the region of the red edge of the 3rd bandgap edge. This level of isolation is particularly large compared to other methods of SRS suppression, and provides a particularly sharp cut-off to the transmission band.

Figure 4:
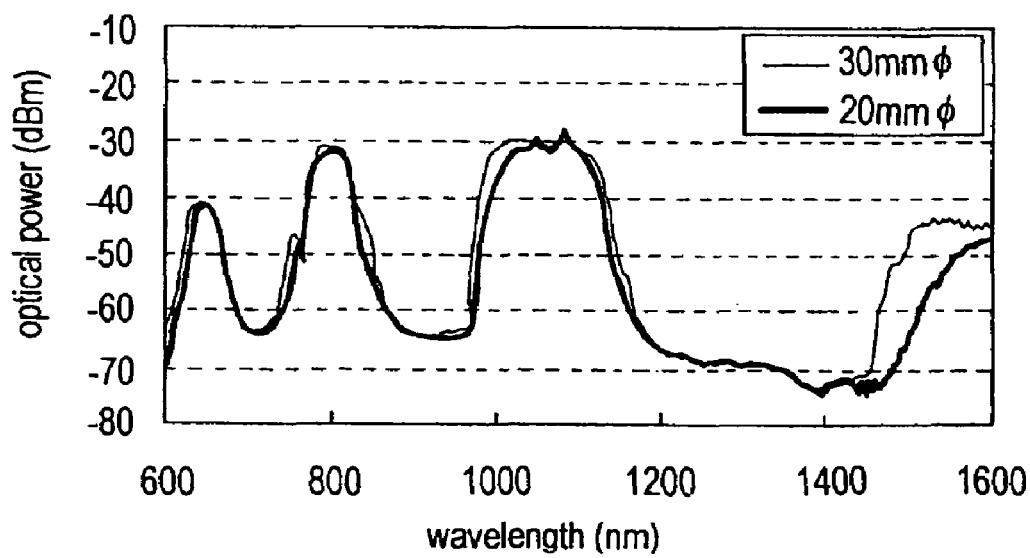
FIG. 4 is a graph showing transmission spectra for the two all-solid PBGF fibres of FIG. 3 when the fibres are bent around a diameter of 20 mm and 30 mm.

Transmission spectra were also measured when fibre #1 was wound around a small diameter mandrel. Diameters of 20 mm and 30 mm were used, and the transmission spectra are shown in FIG. 4. It can be seen that the bandgap edge at 1100 nm does not move even at the smaller winding diameter. This shows that the bandgap edge wavelength of the fibre will be stable when used in practice.

Figure 5:
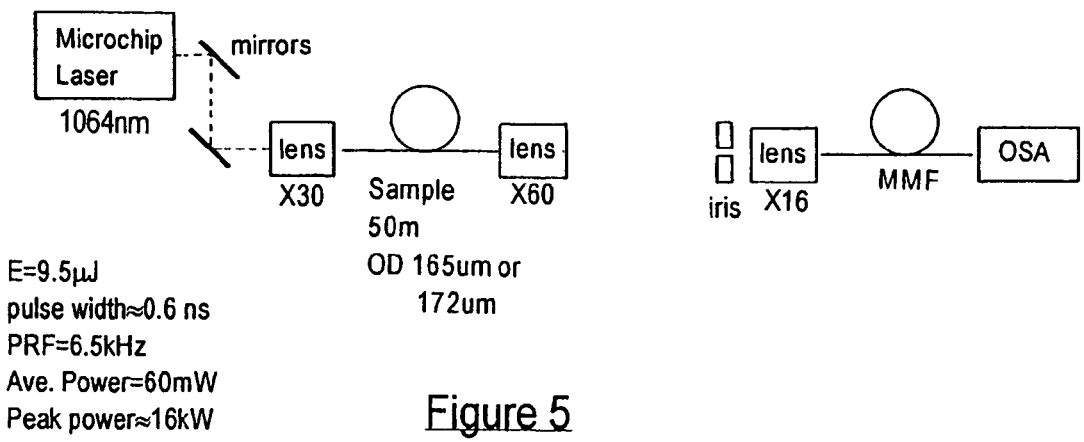
FIG. 5 is a schematic diagram illustrating the experimental set up used to test the SRS suppression.
Figure 6:
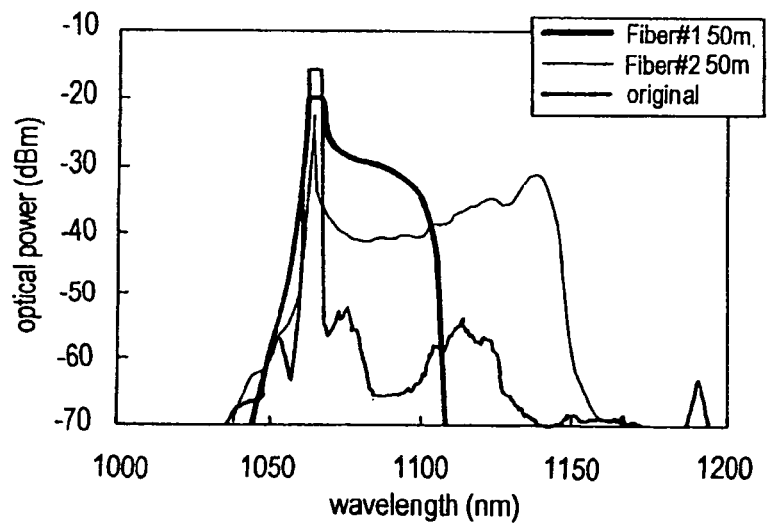
FIG. 6 shows graphs of the transmission spectra of conventional fibre and the two fibres of FIG. 3 when 1064 nm is propagated in the fibres.

An experiment confirming that the fibre is capable of suppressing SRS, that is, reducing the optical power of the Stokes light will now be described. The experimental set up is shown in FIG. 5. Laser light at a wavelength of 1064 nm was coupled by a lens having a 30× magnification factor into the core of a 50 m length of the fabricated PBGF. The laser light was pulsed at a frequency of 6.5 kHz, each pulse having an energy of 9.5 μJ. The pulse width was about 0.6 ns. The average optical power of the laser was 60 mW. The output from the fibre was collimated by a lens having a magnification factor of 60×. The collimated beam was passed through an iris to remove unwanted cladding mode light, and coupled into multimode fibre (MMF). The multimode fibre was connected to an optical spectrum analyser (OSA) to monitor the output spectrum. The results are shown in FIG. 6.

Fibre #2 was used as a reference fibre and has a band edge at 1140 nm. Hence, the first Stokes light is seen at around 1120 nm as this is within the transmission band of that fibre. Fibre #1 has a band edge at 1100 nm. In this fibre, the first Stokes light at around 1120 nm is significantly suppressed. Some spectral broadening is observed in fibre #1, perhaps due to weak continuum. For both fibres, the output spectra around the red edge of the third bandgap are identical to the spectra shown in FIG. 3. This indicates that Raman gain has been significantly suppressed by the high attenuation band of the all-solid PBGF.

The above experiments confirm that PBGF can be used in suppressing Raman gain in optical transmission systems. The all-solid PBGF described is fabricated such that the core of the fibre does not support optical modes at the wavelength of the first Stokes light. Hence, first Stokes light is coupled from the core to cladding modes. Cladding modes are inherently very lossy and rapidly decays any Stokes light in the cladding mode. The all-solid PBGF provides the advantage over conventional SRS suppression techniques in that the bandgap edges are more stable and are particularly tolerant to bending of the fibre.

The person skilled in the art will readily appreciate that the above described invention may be changed in many ways without departing from the scope of the appended claims. For example, different fibres and fibre materials may be used, or the wavelengths of the core optical mode may be changed.

The invention claimed is:

1. An optical transmission system comprising:
    a laser light source arranged to emit light having a frequency ω; and
    an optical transmission line adapted to guide the light,
    wherein said optical transmission line includes a photonic bandgap optical fibre arranged to support a core guided mode at frequency ω and to have an attenuation band at a frequency of ω-13 THz.

2. The optical transmission system of claim 1, wherein the attenuation band is provided by the photonic bandgap fibre having a band edge between the frequency ω and the frequency ω-13 THz.

3. The optical transmission system of claim 1, wherein the photonic bandgap fibre has a transmission loss at a frequency ω-13 THz that is 10 dB greater than the transmission loss at a frequency ω.

4. The optical transmission system of claim 1, wherein the photonic bandgap fibre is an all-solid photonic bandgap fibre including a cladding having a periodic array of elements, each element having higher refractive index than the surrounding background material.

5. The optical transmission system of claim 4, wherein the elements are formed from high index rods of diameter d and spaced apart in the background material on a pitch Λ, wherein d/Λ is 0.6.

6. The optical transmission system of claim 1, wherein the frequency ω is the frequency of light at a wavelength of 1064 nm.

7. A photonic bandgap optical fibre for use in suppressing stimulated Raman scattered light, the fibre comprising:
a core adapted to guide an optical mode at frequency ω, and
a cladding adapted to attenuate an optical mode at a frequency of ω-13 THz.

8. The photonic bandgap optical fibre of claim 7, wherein the fibre has a transmission loss at a frequency ω-13 THz that is 10 dB greater than the transmission loss at a frequency ω.

9. A method of suppressing stimulated Raman scattering in an optical transmission system, comprising:
providing a laser light source emitting light having a frequency ω; and
coupling the emitted light into an optical transmission line, wherein said optical transmission line includes a photonic bandgap fibre having a core guided mode at frequency ω and an attenuation band at a frequency of ω-13 THz.

10. The method of claim 9, wherein the attenuation band is provided by the photonic bandgap fibre having a band edge between the frequency ω and the frequency ω-13 THz.

11. The method of claim 9, wherein the photonic bandgap fibre has a transmission loss at a frequency ω-13 THz that is 10 dB greater than the transmission loss at a frequency ω.

12. The method of claim 9, wherein the photonic bandgap fibre is an all-solid photonic bandgap fibre including a cladding having a periodic array of elements, each element having higher refractive index than the surrounding background material.

13. The method of claim 12, wherein the elements are formed from high index rods of diameter d and spaced apart in the background material on a pitch Λ, wherein d/Λ is 0.6.

14. The method of claim 9, wherein the frequency ω is the frequency of light at 1064 nm.

\* \* \* \* \*

UNITED STATES PATENT AND TRADEMARK OFFICE
CERTIFICATE OF CORRECTION

PATENT NO. : 7,643,715 B2  Page 1 of 1
APPLICATION NO. : 12/081229
DATED : January 5, 2010
INVENTOR(S) : Toshiki Taru et al.

It is certified that error appears in the above-identified patent and that said Letters Patent is hereby corrected as shown below:

On the title page, insert the following:

--Related U.S. Application Data

(60) Provisional Application No. 60/907,662, filed April 13, 2007.--

Signed and Sealed this

Eleventh Day of May, 2010

David J. Kappos
*Director of the United States Patent and Trademark Office*

UNITED STATES PATENT AND TRADEMARK OFFICE
CERTIFICATE OF CORRECTION

PATENT NO.        : 7,643,715 B2
APPLICATION NO.   : 12/081229
DATED             : January 8, 2010
INVENTOR(S)       : Taru et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 103 days.

Signed and Sealed this

Second Day of November, 2010

David J. Kappos
*Director of the United States Patent and Trademark Office*